Nov. 28, 1933.    W. A. LOTH    1,937,026
MEANS FOR SIGNALING
Original Filed Dec. 27, 1923
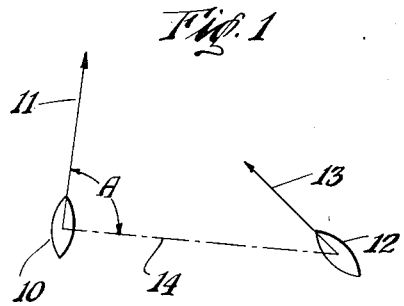
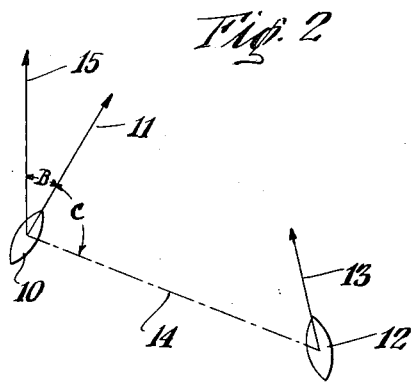
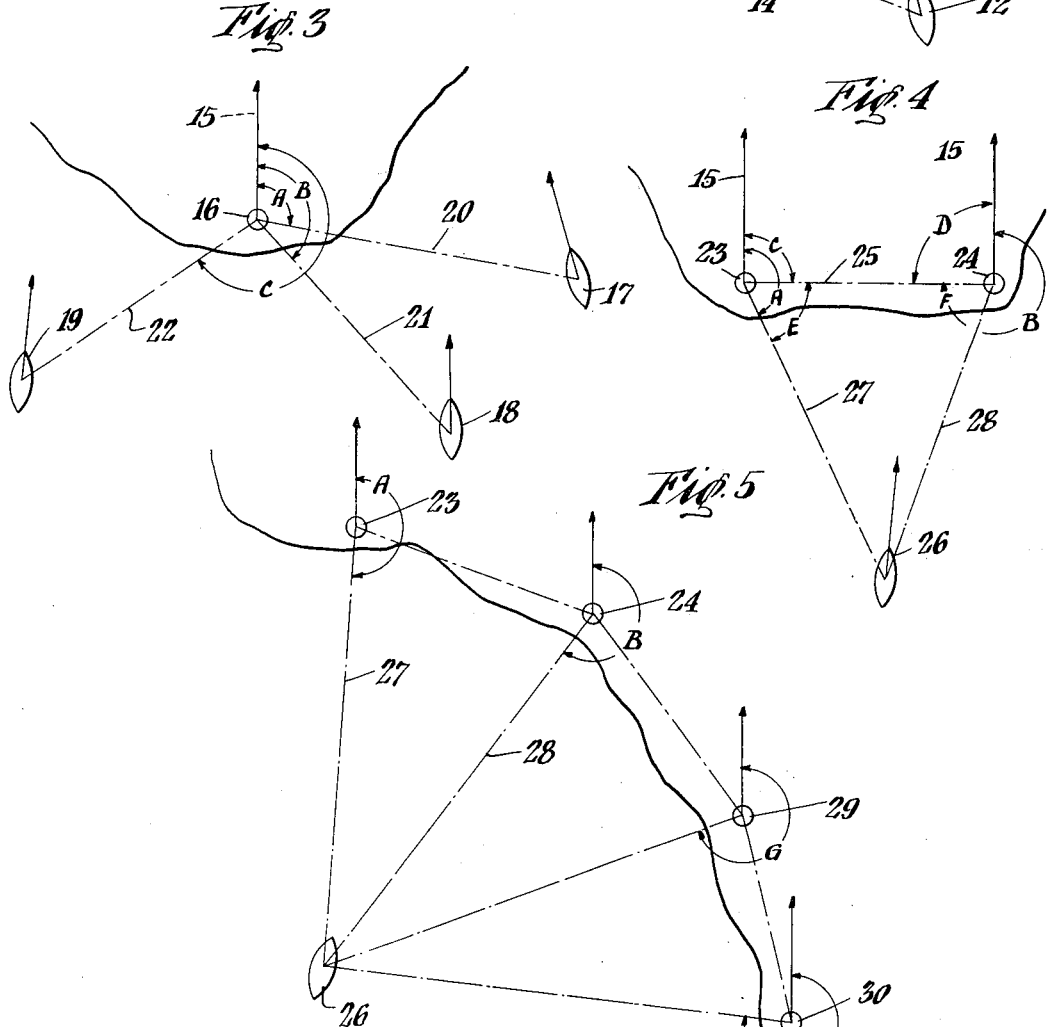
INVENTOR
William A. Loth
BY Hoguet & Neavy
ATTORNEYS Patented Nov. 28, 1933

1,937,026

UNITED STATES PATENT OFFICE 1,937,026

MEANS FOR SIGNALING

William Arthur Loth, Paris, France

Original application December 27, 1923, Serial No. 683,089, and in France January 4, 1923. Divided and this application March 22, 1932. Serial No. 600,512

14 Claims. (Cl. 116—19)

This invention pertains to means for signaling and pertains more particularly to means for determining the course of navigating craft such as vessels, air craft, etc.

In my co-pending application Serial No. 683,089, filed December 27, 1923, for System of acoustic signaling, now Patent No. 1,898,091, issued February 21, 1933, of which this application is a division, I have described a system for signaling the course of a craft in which a predetermined radius on a dial is used as a base line or starting point and a known time interval communicated by signals is employed to indicate each angular distance measured from said base line in a predetermined direction. The radius chosen may be that which is north pointing at the time, or the dial may correspond to the ordinary navigating compass dial and the angular distance may be read directly on the compass dial.

By having a hand mounted at the center of the dial and attached to mechanism adapted to revolve it at a speed so that it will cover angular distances corresponding to the time intervals of the signals, the hand may be made to show directly on the dial the course of the signaling craft. Starting and stopping mechanism for the hand is preferably provided. Such apparatus is also described in my co-pending application.

In said co-pending application I have also described a system for signaling, in which a beam of any character such as a sound beam, light beam, electromagnetic radiation beam, etc. is rotated about a vertical axis at a predetermined speed. When the beam is at its starting point, or in other words at zero angle, which for instance may be due north, or directly across the bow or front end of a navigating craft, a general signal, that is one of non-oriented character is sent out. At a certain predetermined instant of time having a certain known relationship with respect to the sending of such general signal, the beam begins to rotate in a predetermined direction. The beam may be picked up at any point within the area swept by the beam and the time interval elapsed from the beginning of the rotation to the time of reception corresponds to the angle traversed by the beam up to the time it is received at such point. One side of this angle will be an imaginary line drawn between the sending and receiving stations and the other side will be an imaginary line drawn in the direction of the beam at zero angle.

The information thus imparted is of great value for many purposes. For instance let us take the case of two vessels navigating in general proximity to each other, when the visibility is poor. If the sending vessel uses the direction of its course as zero angle, a second vessel receiving the beam after an elapsed time interval may calculate the course of the first vessel.

This may be illustrated upon reference to the drawing, in which Figure 1 diagrammatically illustrates two moving vessels and the angle between the course-line of the sending vessel and an imaginary line joining the two vessels.

Figure 2 diagrammatically illustrates two moving vessels and the angles defined by the north-south line, the course-line of the sending vessel and the imaginary line joining the two vessels.

Figure 3 diagrammatically illustrates a stationary sending station and the angles defined by the north-south line and imaginary lines joining the sending station and moving vessels.

Figure 4 is similar to Figure 3 but shows two sending stations.

Figure 5 is similar to Figure 4 but shows a larger number of sending stations.

In Figure 1 10 is a vessel having a course as indicated by arrow 11. 12 is a second vessel having a course as indicated by arrow 13. 14 is an imaginary line drawn between vessels 10 and 12. Let us assume that a non-oriented signal having a duration of four seconds is employed and that the beam starts rotating in a clockwise direction from a position corresponding to the arrow 11 at the end of the non-oriented signal. The time elapsed between the end of the non-oriented signal and the reception of the beam at 12 will correspond to an angle equal to A. Because of the constant known speed of rotation of the beam, this angle may be calculated from the time elapsed, or apparatus such as disclosed in my co-pending application, which will show the angle directly, may be employed.

The vessel 12 will thus be made aware of any likelihood of collision between it and vessel 10. If vessel 12 were then to send out a similar signal, vessel 10 also would be made aware of any likelihood of collision with vessel 12.

The vessels 10 and 12 might also be advised as to the distance between each other by the means described in my co-pending application. In the use of such means one vessel sends out a sound signal which is immediately acknowledged when received by the second vessel. The time elapsed between the sending of the first signal and the return of the acknowledging signal is equal to twice the time required for sound to travel the distance between the two vessels. The speed of sound being known, the distance can be calculated.

This emission rotating about a vertical axis can obviously be completed by a second emission rotating about a horizontal axis, for approximately obtaining the distance where is located the emitting vessel by utilizing the same mechanism resulting in a further security.

The sending vessel may of course employ any other zero angle. For instance some other radius on the compass dial may be used to indicate the zero angle. The radius directly under the compass needle at the time of sending is very useful inasmuch as it is substantially north pointing. The course of the sending vessel with respect to north may thus be given by sending out a non-oriented signal in the usual way, starting the rotation with north as the zero angle and then sending out a second non-oriented signal when the beam is directly over the bow of the sending vessel.

This is illustrated in Figure 2 in which the dotted arrow shown at 15 indicates the direction of the compass needle, and the angle B measured clockwise from the arrow 15 shows the angle between the course of vessel 10 and north.

Inasmuch as a beam would generally be rotated through a full 360 degrees to bring it back to the starting point, it would be picked up after a further time interval by the vessel 12. Vessel 12 having received the two spaced non-oriented signals and having noted the time interval between the same would be informed, first as to the angle between the course of vessel 10 and north (angle B), and second as to the angle between the imaginary line 14 and the course of vessel 10 (angle C), and third as to the angle between the imaginary line 14 and the arrow 15, or in other words north (angle C plus angle B). This information apprises vessel 12 of the relative direction of vessel 10 and if the signals for distance are exchanged the exact positions of the two vessels may be plotted.

The sending vessel may of course be either moving or stationary. If it is maintained anchored in a known position it will function as a beacon and for this purpose it might be substituted by a station on land. In Figure 3, for instance, is shown a station 16 at a known location. Its beam could be picked up by any number of vessels within the area of its sweep such as those illustrated at 17, 18 and 19.

The vessel 17 would be advised as to the value of angle A and knowing the location of the station 16 would be able to draw the line 20, that is, it would know the direction of station 16.

The vessel 18 would be advised as to the value of angle B and would be able to draw the line 21.

The vessel 19 would be advised as to the value of angle C and would be able to draw the line 22.

Distance signals might also be used in this instance to obtain exact position.

By the use of two beacons the distance between a receiving vessel and each beacon might be directly calculated. This is illustrated in Figure 4 in which 23 represents one beacon and 24 the other beacon. The length of the straight line 25 between beacons 23 and 24 and the angles C and D are unchangeable. Angles A and B may be calculated from the elapsed time intervals as above described. A vessel 26 would receive a beam from beacon 23 along a line represented by 27 and would receive a beam from beacon 24 along a line represented by 28. Angle E of the triangle formed by the lines 25, 27 and 28 is equal to angle A minus angle C. Angle F is equal to 360 degrees—(angle B+angle D). Angles E and F and the length of line 25 being known, the lengths of lines 27 and 28 may be calculated.

Any means may be employed for identifying the beacon from which a particular beam is received such as by a modulated or other signal, color of light, pitch of sound, etc.

If the vessel 26 were able to receive from more than two beacons while in one position, a plurality of triangles might be formed and the readings checked. This is shown diagrammatically in Figure 5 in which beacons 23 and 24 are reproduced and beacons 29 and 30 are added. The number of beacons could of course be multiplied without limit.

The vessel 26 in the position shown in Figure 5 could make three independent calculations of its position as will be readily understood from the diagram.

For the purpose of illustration merely, I have described the invention in connection with vessels at sea. However, it is to be strictly understood that the invention is in no way limited thereto but is equally applicable to air craft or even to craft moving on land. It is also obviously applicable to submarine and subterranean uses.

Any other means may be employed to indicate when the beam begins to rotate. For instance the beam may be started rotating at certain specified times, say at 2 or 5 minute intervals. To use such a system all clocks should be preferably in synchronism.

It is obvious that the same principles forming the subject matter of the invention apply to liquid waves as well as to aerial waves whether these waves are sonorous or ultra-sonorous.

Means for producing beams by sound, by light and by electromagnetic waves are well known in the art. Radio beams are not only produced by short wave phenomena but also by waves of longer length, for instance by apparatus used for radio beacon work.

Having described my invention it is obvious that many modifications may be made in the same within the scope of the claims without departing from the spirit thereof.

I claim:

1. A method of signaling comprising rotating a beam about an axis from a predetermined point in a predetermined direction and at a predetermined speed, providing means for knowing when the rotation begins, receiving said beam at a point within the sweep thereof, determining the angular distance traversed by the beam between said predetermined point and said point of reception from the time required for the beam to travel from said predetermined point to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

2. A method of signaling comprising rotating a beam about an axis from a predetermined point in a predetermined direction and at a predetermined speed, sending a non-oriented signal to indicate when said beam leaves said predetermined point, receiving said beam at a point within the sweep thereof, determining the angular distance traversed by the beam between said predetermined point and said point of reception from the time required for the beam to travel from said predetermined point to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

3. A method of signaling comprising rotating a beam about an axis from a predetermined point starting at a predetermined time, said rotation being in a predetermined direction and at a predetermined speed, receiving said beam at a point within the sweep thereof, determining the angular distance traversed by the beam between said predetermined point and said point of reception from the time required for the beam to travel from said predetermined point to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

4. A method of signaling comprising rotating a beam about an axis starting from north, said rotation being in a predetermined direction and at a predetermined speed, providing means for knowing when the beam leaves the north position, receiving said beam at a point within the sweep thereof, determining the angular distance traversed by the beam between said north position and said point of reception from the time required for the beam to travel from the north position to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

5. A method of signaling comprising rotating a beam about an axis from a north pointing position, said rotation being clockwise and at a predetermined speed, providing means for knowing when the beam leaves said north pointing position, receiving said beam at a point within the sweep thereof, determining the angular distance traversed by the beam between said north pointing position and said point of reception from the time required for the beam to travel from said north pointing position to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

6. A method of signaling the course of a navigating craft comprising rotating a beam about an axis on said craft from a point in which the beam points in the direction in which the craft is moving, said rotation being in a predetermined direction and at a predetermined speed, providing means for knowing when said beam leaves said point, receiving said beam at a point within the sweep thereof, determining the angular distance traversed by the beam between said first and second mentioned points from the time required for the beam to travel from said first to said second mentioned points, and finding the distance between the position of said axis of rotation and the position of said point of reception by an interchange of signals between said two positions to determine the time required for sound to travel between said two positions, and calculating said distance from said required time.

7. A method of signaling the course of a craft comprising rotating a beam about an axis on said craft starting from a position in which the beam points in the direction of the course of the craft, said rotation being clockwise and at a predetermined speed, providing means for knowing the time when the beam leaves said first mentioned position, receiving said beam at a point within the sweep thereof, determining the angular distance traversed by the beam between said first mentioned position and said point of reception from the time required for the beam to travel from said first mentioned position to said point of reception, and finding the distance between the position of said axis of rotation and the position of said point of reception by an interchange of signals between said two positions to determine the time required for sound to travel between said two positions, and calculating said distance from said required time.

8. A method of signaling the course of a craft comprising rotating a beam about an axis on said craft from a north pointing position in a predetermined direction and at a predetermined speed, sending a non-oriented signal when the beam leaves the north pointing position, sending a non-oriented signal when said beam points in the direction of the course of said craft, determining the angular distance traversed by said beam between said north pointing position and said course pointing position from the time required for the beam to travel from said north pointing position to said course pointing position, finding the distance between the position of said axis of rotation and a second position, at which said non-oriented signals are received, by an interchange of signals between said two positions to determine the time required for sound to travel between said two positions, and calculating said distance from said required time.

9. A method of signaling the course of a craft comprising rotating a beam about an axis on said craft from a north pointing position in a clockwise direction and at a predetermined speed, sending a non-oriented signal when the beam leaves said north pointing position, sending a non-oriented signal when said beam points in the direction of the course of said craft, determining the angular distance traversed by said beam between said north pointing position and said course pointing position from the time required for the beam to travel from said north pointing position to said course pointing position, finding the distance between the position of said axis of rotation and a second position, at which said non-oriented signals are received, by an interchange of signals between said two positions to determine the time required for sound to travel between said two positions, and calculating said distance from said required time.

10. A method of signaling the course of a craft comprising rotating a beam about an axis on said craft from a north pointing position in a predetermined direction and at a predetermined speed, providing means for knowing when the beam leaves the north pointing position, sending a non-oriented signal when said beam points in the direction of the course of said craft, then receiving said beam at a point within the sweep thereof, determining the angular distances traversed by said beam when in course pointing position and when receiving from the time required for the beam to travel between north pointing, course pointing and point of reception pointing positions, and finding the distance between the position of said axis of rotation and the position of said point of reception by an interchange of signals between said two positions to determine the time required for sound to travel between said two positions, and calculating said distance from said required time.

11. A method of signaling the course of a craft comprising rotating a beam about an axis on said craft from a north pointing position in a clockwise direction and at a predetermined speed, providing means for knowing when the beam leaves the north pointing position, sending a non-oriented signal when said beam points in the direction of the course of said craft, then receiving said beam at a point within the sweep thereof, determining the angular distances traversed by said beam when in course pointing position and when received from the time required for the beam to travel between north pointing, course pointing and point of reception pointing positions, and finding the distance between the position of said axis of rotation and the position of said point of reception by an interchange of signals between said two positions to determine the time required for sound to travel between said two positions, and calculating said distance from said required time.

12. A method of signaling comprising rotating a beam about a stationary axis from a north pointing position in a predetermined direction and at a predetermined speed, providing means for knowing when the beam leaves the north pointing position, receiving said beam at a point within the sweep thereof, determining the angular distance traversed by the beam between said north pointing position and said point of reception from the time required for the beam to travel from said north pointing position to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

13. A method of signaling comprising rotating a beam about a stationary axis from a north pointing position in a clockwise direction and at a predetermined speed, providing means for knowing when the beam leaves the north pointing position, receiving said beam at a point within the sweep thereof, determining the angular distance traversed by the beam between said north pointing position and said point of reception from the time required for the beam to travel from said north pointing position to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

14. A method of signaling comprising rotating a beam about a stationary axis from a predetermined point in a predetermined direction and at a predetermined speed, providing means for knowing when the beam leaves the initial pointing position, receiving said beam at a point within the sweep thereof, determining the angular distance traversed by the beam between said initial pointing position and said point of reception from the time required for the beam to travel from said initial pointing position to the point of reception, and determining the distance between the position of said axis of rotation and the position of said point of reception by sending a sound signal from one of said positions, acknowledging the receipt of said sound signal at the other of said positions by immediately sending a second sound signal at said other position, and calculating said distance at the first sound signaling position from the time elapsed between the sending of said first sound signal and the receipt of said second sound signal.

WILLIAM ARTHUR LOTH.